(12) United States Patent
Fujikawa et al.

(10) Patent No.: US 10,751,672 B2
(45) Date of Patent: Aug. 25, 2020

(54) GAS-PERMEABLE MEMBRANE

(71) Applicants: NanoMembrane Technologies, Inc., Fukuoka (JP); Tokyo Ohka Kogyo Co., Ltd., Kanagawa (JP)

(72) Inventors: Shigenori Fujikawa, Fukuoka (JP); Selyanchyn Roman, Fukuoka (JP); Takahiro Senzaki, Kawasaki (JP); Takuya Noguchi, Kawasaki (JP); Toshiyuki Ogata, Kawasaki (JP)

(73) Assignees: NANOMEMBRANE TECHNOLOGIES, INC., Fukuoka (JP); TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 15/646,282

(22) Filed: Jul. 11, 2017

(65) Prior Publication Data
US 2018/0021738 A1    Jan. 25, 2018

(30) Foreign Application Priority Data

Jul. 25, 2016  (JP) .................. 2016-145204

(51) Int. Cl.
| | | |
|---|---|---|
| B01D 71/70 | (2006.01) | |
| B01D 71/44 | (2006.01) | |
| C08G 77/18 | (2006.01) | |
| C08G 77/16 | (2006.01) | |
| C08G 77/20 | (2006.01) | |
| C08G 77/398 | (2006.01) | |
| C08L 43/04 | (2006.01) | |
| B01D 53/22 | (2006.01) | |
| B01D 67/00 | (2006.01) | |
| C08G 77/58 | (2006.01) | |

(52) U.S. Cl.
CPC .......... B01D 71/44 (2013.01); B01D 53/228 (2013.01); B01D 67/0083 (2013.01); B01D 67/0093 (2013.01); B01D 71/70 (2013.01); C08G 77/16 (2013.01); C08G 77/18 (2013.01); C08G 77/20 (2013.01); C08G 77/398 (2013.01); C08G 77/58 (2013.01); C08L 43/04 (2013.01); *B01D 2323/30* (2013.01)

(58) Field of Classification Search
None
See application file for complete search history.

(56) References Cited

U.S. PATENT DOCUMENTS

| | | | | |
|---|---|---|---|---|
| 5,772,735 A | * | 6/1998 | Sehgal | B01D 53/228 |
| | | | | 210/490 |
| 9,855,532 B2 | * | 1/2018 | Lee | B01D 69/125 |

| | | | | |
|---|---|---|---|---|
| 2007/0092776 A1 | * | 4/2007 | Akiyama | B01D 67/0006 |
| | | | | 429/493 |
| 2009/0101008 A1 | * | 4/2009 | Lackner | B01D 53/228 |
| | | | | 95/51 |
| 2009/0146323 A1 | * | 6/2009 | Katayama | H01L 23/296 |
| | | | | 257/791 |
| 2009/0205500 A1 | * | 8/2009 | Oyama | B01D 67/0072 |
| | | | | 96/13 |

(Continued)

FOREIGN PATENT DOCUMENTS

| | | |
|---|---|---|
| EP | 2 735 379 | 5/2014 |
| JP | 02-149323 | 6/1990 |

(Continued)

OTHER PUBLICATIONS

Jose et al. "Synthessi, Characterization, and Permeability Evaluation of Hybrid Organic-Inorganic Films" Journal of Polymer Science : Part B: Polymer Physics, 2004(42), 4281-4292. (Year: 2004).*

(Continued)

*Primary Examiner* — Robert S Loewe
(74) *Attorney, Agent, or Firm* — Wenderoth, Lind & Ponack, L.L.P.

(57) ABSTRACT

The present invention provides a gas-permeable membrane comprising a partial structure represented by formula (I) or formula (II), (wherein $R^1$ and $R^2$ each independently represents a hydrogen atom, an alkyl group having 1 to 6 carbon atoms, an alkenyl group having 2 to 6 carbon atoms, an alkoxy group having 1 to 6 carbon atoms, an alkenyloxy group having 2 to 6 carbon atoms, an aryl group or an aryloxy group, $M^1$, $M^2$ and $M^3$ each independently represents a metal atom, m1 represents an integer, n1, n2 and n3 each independently represents an integer of 1 to 3, * represents a bonding hand), a composition for forming the gas-permeable membrane and a production process of the gas-permeable membrane.

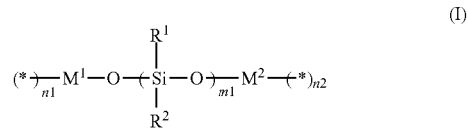

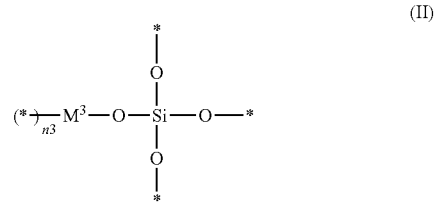

2 Claims, No Drawings

(56) References Cited

U.S. PATENT DOCUMENTS

| | | | | |
|---|---|---|---|---|
| 2009/0305589 A1* | 12/2009 | Budden | C08G 77/398 | 442/59 |
| 2011/0021736 A1* | 1/2011 | Zhu | C09J 183/14 | 528/8 |
| 2011/0030382 A1* | 2/2011 | Eadon | B01D 53/22 | 60/780 |
| 2011/0052466 A1* | 3/2011 | Liu | B01D 53/228 | 423/230 |
| 2011/0268618 A1* | 11/2011 | Finkenrath | B01D 53/229 | 422/169 |
| 2011/0282086 A1* | 11/2011 | Murakami | C08L 83/04 | 556/10 |
| 2012/0028388 A1* | 2/2012 | Katayama | H01L 33/50 | 438/27 |
| 2012/0270976 A1* | 10/2012 | Kawakami | B01D 53/228 | 524/217 |
| 2012/0329896 A1* | 12/2012 | Bloomfield | C08L 83/14 | 521/152 |
| 2013/0023686 A1* | 1/2013 | Shindou | C08G 77/04 | 556/451 |
| 2013/0153930 A1* | 6/2013 | Shindou | C07F 19/00 | 257/77 |
| 2013/0334458 A1* | 12/2013 | Huang | C08G 77/44 | 252/182.3 |
| 2015/0321150 A1* | 11/2015 | Kurahashi | B01D 69/12 | 427/243 |
| 2017/0209838 A1* | 7/2017 | Ho | B01D 71/68 | |

FOREIGN PATENT DOCUMENTS

| | | |
|---|---|---|
| JP | 5-111626 | 5/1993 |
| JP | 2000-005579 | 1/2000 |
| JP | 2000-157853 | 6/2000 |
| JP | 2004-314047 | 11/2004 |
| JP | 2008-55326 | 3/2008 |
| JP | 2011-161387 | 8/2011 |
| JP | 2014-58609 | 4/2014 |
| WO | 2014/001791 | 1/2014 |
| WO | 2014/001792 | 1/2014 |

OTHER PUBLICATIONS

Soufyani et al. "Silicone modified silica membrane. Application to the gas separation" 2001, 25, 451-457. (Year: 2001).*

Kim et al. "Proton conducting polydimethylsiloxane/metal oxide hybrid membranes added with phosphotungstic acid(II)" Electrochimica Acta, 2004, 49, 3429-3433. (Year: 2004).*

Gomes et al. "Hybrid PDMS-Silica-Zirconia materials prepared by gamma-irradiation" Nuclear Instruments and Methods in Physics Research B, 2007, 265, 114-117. (Year: 2007).*

Yamada et al. "Formation Behavior and Optical Properties of Transparent Inorganic-Organic Hybrids Prepared from Metal Alkoxides and Polydinnethylsiloxane" Journal of Sol-Gel Science and Technology, 2000, 17, 123-130. (Year: 2000).*

Lu et al. "In situ Synthesis of High Refractive Index PDMS/Metal Oxide Nanoconnposites" Mater. Res. Soc. Symp. Proc. vol. 1400, Materials Research Society, 2012. (Year: 2012).*

Katayama et al. "Processing of transparent inorganic/organic hybrids using metal alkoxides and polydinnethylsiloxane" SPIE, vol. 3136, pp. 134-142, 1997. (Year: 1997).*

Yamada et al. "Synthesis and dynamic mechanical behaviour of inorganic-organic hybrids containing various inorganic components" J. Mater. Chem. 1997, 7(8), 1491-1495. (Year: 1997).*

Boffa et al. "Hydrothermal stability of microporous silica and niobia-silica membranes" Journal of Membrane Science 2008, 319, 256-263. (Year: 2008).*

Dire et al. "Sol-Gel Synthesis of Siloxane-Oxide Hybrid Coatings [Si(CH3)2O.MOx: M=Si, Ti, Zr, Al] with Luminescent Properties" J. Mater. Chem. 1992, 2(2), 239-244. (Year: 1992).*

Extended European Search Report dated Nov. 28, 2017 in European Application No. 17181941.0.

Office Action dated Apr. 7, 2020 in Japanese Patent Application No. 2016-145204.

* cited by examiner

GAS-PERMEABLE MEMBRANE

TECHNICAL FIELD

The present invention relates to a polymer membrane having high gas permeability, particularly a polymer membrane excellent in selective permeability to carbon dioxide, and a composition for producing the polymer membrane.

Priority is claimed on Japanese Patent Application No. 2016-145204, filed Jul. 25, 2016, the content of which is incorporated herein by reference.

BACKGROUND ART

In recent years, attempts to selectively recover gases, particularly carbon dioxide gas, have been made using a polymer membrane. Carbon dioxide gas is one of the causes of global warming, so it is preferable to selectively recover carbon dioxide from the exhaust gas from power plants and factories. Examples of a method for separating and recovering carbon dioxide from the exhaust gas include a method of absorbing carbon dioxide into a solution, a method of adsorbing carbon dioxide with an adsorbent, a method of separating and recovering with a membrane having high selective permeability to carbon dioxide, and the like. Particularly, the membrane separation method is preferable because energy and cost required for separating carbon dioxide can be kept low.

Development of polymer membranes with high selective permeability to specific gases is vigorous. For example, Patent Document 1 discloses that a polymer membrane made of a crosslinked product of a mixture of polydimethylsiloxane and polydiphenylsiloxane can be used as an oxygen gas separation membrane having high oxygen permeability and excellent heat resistance and mechanical properties. In addition, Patent Document 2 discloses that a transition metal salt-polymer mixed membrane composed of a transition metal salt and a polymer not having a functional group forming a complex with the transition metal salt has high permeability and selectivity to alkene hydrocarbons such as ethylene. Patent Document 3 discloses that a gas separation membrane including a separation-active membrane containing a crosslinked polymer and a compound having a molecular weight of 150,000 or less capable of interacting with an acidic gas and a porous membrane having a molecular weight cutoff of 500,000 or less is suitable for separation of acidic gas such as carbon dioxide. In addition, Patent Document 4 discloses a membrane in which an organometallic complex in which an aryl group and a heterocyclic group are coordinated to two molecules of copper (II) atoms or rhodium (II) atoms is dispersed in a resin as a membrane for separating an organic compound such as a lower alcohol from a solution.

PRIOR ART LITERATURE

Patent Documents

[Patent Document 1] Japanese Unexamined Patent Publication No. Hei 5-111626
[Patent Document 2] Japanese Unexamined Patent Application Publication No. 2004-314047
[Patent Document 3] Japanese Unexamined Patent Publication No. 2011-161387
[Patent Document 4] Japanese Unexamined Patent Publication No. 2008-055326

DISCLOSURE OF INVENTION

Problems to be Solved by the Invention

An object of the present invention is to provide a polymer membrane having high gas permeability, particularly, selective permeability to carbon dioxide, and a composition for producing the polymer membrane.

Means for Solving the Problems

In order to achieve the above object, the present invention adopts the following constitution.

That is, a first aspect of the present invention is a gas-permeable membrane including a partial structure represented by the following general formula (I), [in formula (I), $R^1$ and $R^2$ each independently represents an alkyl group having 1 to 6 carbon atoms, an alkenyl group having 2 to 6 carbon atoms, an alkoxy group having 1 to 6 carbon atoms, an alkenyloxy group having 2 to 6 carbon atoms, an aryl group, or an aryloxy group, $M^1$ and $M^2$ each independently represents a metal atom, m1 represents a positive integer, n1 and n2 each independently represents an integer of 1 to 3. In addition, * represents a bonding hand.] or a partial structure represented by the following general formula (II) [in formula (II), $M^3$ represents a metal atom, n3 represents an integer of 1 to 3. In addition, * represents a bonding hand.]

[Chemical formula 1]

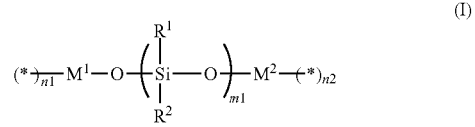

[Chemical formula 2]

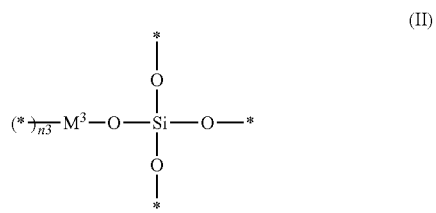

A second aspect of the present invention is a composition for forming a gas-permeable membrane including a polymer having a siloxane bond as a main chain and having at least two hydroxyl groups per molecule, and a metal compound capable of generating at least two hydroxyl groups per molecule by hydrolysis.

The polymer is preferably at least one selected from the group consisting of a linear polymer having a siloxane bond as a main chain and having at least two hydroxyl groups per molecule, and a silsesquioxane derivative having at least two hydroxyl groups per molecule.

A third aspect of the present invention is a method for producing a gas-permeable membrane in which the composition for forming a gas-permeable membrane according to the second aspect is heat-treated to produce a polymer membrane.

Effects of the Invention

According to the present invention, it is possible to provide a gas-permeable membrane having excellent selectivity and permeability, particularly to carbon dioxide, and a composition for producing the gas-permeable membrane.

BEST MODE FOR CARRYING OUT THE INVENTION

<Gas-Permeable Membrane>

A gas-permeable membrane according to the first aspect of the present invention has a partial structure represented by the following general formula (I) or a partial structure represented by the following general formula (II). As shown in the following general formulas (I) and (II), the gas-permeable membrane is a polymer membrane obtained by crosslinking the main chains of the polymer having siloxane bonds (—Si—O—Si—) as a main chain with metal atoms.

[Chemical formula 3]

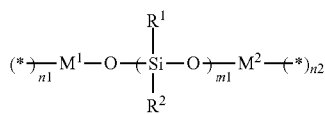

(I)

[Chemical formula 4]

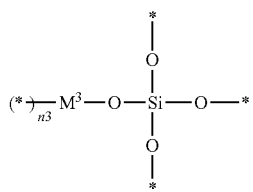

(II)

$R^1$ and $R^2$ in general formula (I) each independently represents a hydrogen atom, a hydroxyl group, an alkyl group having 1 to 6 carbon atoms, an alkenyl group having 2 to 6 carbon atoms, an alkoxy group having 1 to 6 carbon atoms, an alkenyloxy group of 2 to 6, an aryl group, or an aryloxy group.

The alkyl group having 1 to 6 carbon atoms may be linear or branched. It may also be an alkyl group in which one or several hydrogen atoms are substituted with other functional groups. Examples of the substituent of the alkyl group include an alkoxy group, an alkenyloxy group, a phenyl group, a hydroxyl group, a carboxyl group, an amino group, a halogen atom, a thiol group, and the like. In the case of having two or more substituents, they may be the same type of substituents or different types of substituents. Specific examples thereof include a methyl group, ethyl group, propyl group, isopropyl group, n-butyl group, isobutyl group, t-butyl group, pentyl group, isoamyl group, hexyl group, benzyl group, phenylethyl group, 2-phenylpropyl group, trifluoropropyl group, carboxymethyl group, aminomethyl group and the like. In addition, a hydroxyalkyl group such as a hydroxymethyl group, hydroxyethyl group, hydroxypropyl group, hydroxyisopropyl group, hydroxybutyl group, hydroxyisobutyl group and hydroxy t-butyl group can also be exemplified.

The alkenyl group having 2 to 6 carbon atoms may be linear or branched. It may also be an alkenyl group in which one or several hydrogen atoms are substituted with other functional groups. As the substituent of the alkenyl group, the same substituents as those of the alkyl group can be exemplified. Specific examples thereof include a vinyl group, 1-propenyl group, 2-propenyl group, 1-methylvinyl group, 2-methyl-1-propenyl group, 1-butenyl group, 2-butenyl group, 3-butenyl group, 1-pentenyl group and 1-hexenyl group.

The alkyl group moiety of the alkoxy group having 1 to 6 carbon atoms may be linear or branched. It may also be an alkoxy group in which one or several hydrogen atoms are substituted with other functional groups. As the substituent of the alkoxy group, the same substituents as those of the alkyl group can be exemplified. Specific examples thereof include a methoxy group, ethoxy group, propoxy group, isopropoxy group, n-butoxy group, isobutoxy group, t-butoxy group, pentyloxy group, isoamyloxy group, hexyloxy group, phenylmethoxy group, and phenyl ethoxy group.

The alkenyl group moiety of the alkenyloxy group having 2 to 6 carbon atoms may be linear or branched. It may also be an alkenyloxy group in which one or several hydrogen atoms are substituted with other functional groups. As the substituent of the alkenyloxy group, the same substituents as those of the alkyl group can be exemplified. Specific examples thereof include a vinyloxy group, 1-propenyloxy group, 2-propenyloxy group, 1-methylvinyloxy group, 2-methyl-1-propenyloxy group, 1-butenyloxy group, 2-butenyloxy group, 3-butenyloxy group, 1-pentenyloxy group and 1-hexenyloxy group.

The aryl group may be a monocyclic ring, a condensed ring or a group in which a plurality of aromatic rings are bonded by a single bond. It may also be an aryl group in which one or several hydrogen atoms are substituted with other functional groups. Examples of the substituent of the aryl group include an alkyl group, alkenyl group, alkoxy group, alkenyloxy group, carboxyl group, amino group, halogen atom, thiol group, and the like. In the case of having two or more substituents, they may be the same type of substituents or different types of substituents. Specific examples thereof include a phenyl group, tolyl group, xylyl group, methoxyphenyl group, ethoxyphenyl group, butoxyphenyl group, naphthyl group, dimethylnaphthyl group, indenyl group, biphenyl group, anthryl group, phenanthryl group, pyrenyl group, chrysenyl group, naphthacenyl group, fluorenyl group and the like.

The aryl group moiety of the aryloxy group may be a monocyclic ring, a condensed ring or a group in which a plurality of aromatic rings are bonded by a single bond. It may also be an aryloxy group in which one or several hydrogen atoms are substituted with other functional groups. As the substituent of the aryloxy group, the same substituents as those of the aryl group can be exemplified. Specific examples thereof include a phenoxy group, tolyloxy group, xylyloxy group, methoxyphenyloxy group, ethoxyphenyloxy group, butoxyphenyloxy group, naphthyloxy group, dimethylnaphthyloxy group, and the like.

In the partial structure represented by general formula (I), it is preferable that $R^1$ and $R^2$ each independently be a hydrogen atom, a hydroxyl group, an alkyl group having 1 to 6 carbon atoms, or an aryl group, more preferable that $R^1$ and $R^2$ each independently be a hydrogen atom, a methyl group, an ethyl group, a propyl group, an isopropyl group, a phenyl group, a tolyl group or a xylyl group, more preferable that $R^1$ and $R^2$ each independently be a methyl group or isopropyl group, and particularly preferable that both $R^1$ and $R^2$ be a methyl group.

In general formulas (I) and (II), $M^1$, $M^2$ and $M^3$ are each independently a metal atom. As the metal atom, germanium, antimony, selenium, tellurium, silicon, boron and the like are also included in addition to the ordinary metals. $M^1$ and $M^2$ in general formula (I) may be the same type of metal atoms or different types of metal atoms. In the partial structures represented by general formulas (I) and (II), it is preferable that $M^1$, $M^2$ and $M^3$ be a titanium, zirconium, hafnium, aluminum, niobium, lanthanide, yttrium, barium, cobalt, iron, tantalum, silicon or boron, more preferable that $M^1$, $M^2$ and $M^3$ be a titanium, zirconium, hafnium, aluminum, niobium, silicon or boron, and more preferable that M, $M^2$ and $M^3$ be a titanium or zirconium.

In formula (I), m1 is a positive integer. There are no particular restrictions on the numerical value of m1. For example, the size of $R^1$ and $R^2$ can be appropriately adjusted in order that the molecular weight of the siloxane chain moiety (moiety having a linear structure composed of a siloxane bond) in general formula (I) become 100 to 100,000.

In general formulas (I) and (II), * represents a bonding hand, n1, n2 and n3 each independently represents an integer of 1 to 3. It is preferable that n1, n2, and n3 be 3. Since the number of bonding hands of the metal atom is 2 or more, the metal atom can function as a crosslinking agent. n1, n2 and n3 are also influenced by the type of metal atom. Specifically, n1, n2 and n3 can be 3 when the metal atom is titanium, zirconium, or hafnium and can be 2 when the metal atom is aluminum, lanthanide, or yttrium, and can be 1 when the metal atom is cobalt.

Among the bonding hands in general formula (II), the bonding hands of three oxygen atoms are each bonded to silicon atoms in other partial structures represented by general formula (II).

In the partial structure represented by general formula (I), it is preferable that $M^1$ and $M^2$ each independently be a titanium, zirconium, hafnium, aluminum, niobium, lanthanide, yttrium, barium, cobalt, iron, tantalum, silicon or boron, $R^1$ and $R^2$ each independently be a hydrogen atom, a hydroxyl group, an alkyl group having 1 to 6 carbon atoms, or an aryl group, and more preferable that $M^1$ and $M^2$ each independently be a titanium, zirconium, hafnium, aluminum, niobium, lanthanide, yttrium, barium, cobalt, iron, tantalum, silicon, or boron, and $R^1$ and $R^2$ each independently be a hydrogen atom, an alkyl group having 1 to 6 carbon atoms, or an aryl group, and more preferable that $M^1$ and $M^2$ each independently be a titanium, zirconium, hafnium, aluminum, niobium, lanthanide, yttrium, barium, cobalt, iron, tantalum, silicon or boron, $R^1$ and $R^2$ each independently be a methyl group, ethyl group, or a propyl group, and more preferable that $M^1$ and $M^2$ each independently be a titanium, zirconium, hafnium, aluminum, niobium, lanthanide, yttrium, barium, cobalt, iron, tantalum, silicon or boron, and $R^1$ and $R^2$ be methyl groups, and particularly preferable that $M^1$ and $M^2$ each independently be a titanium, zirconium, hafnium, aluminum, niobium, silicon or boron, and $R^1$ and $R^2$ be a methyl group.

In the partial structure represented by general formula (II), it is preferable that $M^3$ be a titanium, zirconium, hafnium, aluminum, niobium, lanthanide, yttrium, barium, cobalt, iron, tantalum, silicon, or boron, more preferable that $M^3$ be a titanium, zirconium, hafnium, aluminum, niobium, silicon, or boron, and more preferable that $M^3$ be a titanium or zirconium.

Among the gas-permeable membranes according to the first aspect of the present invention, in those having a partial structure represented by general formula (I), at least one of the bonding hands of $M^1$ and $M^2$ is bonded to an oxygen atom which is present in another partial structure represented by general formula (I) and bonded to a silicon atom, thereby crosslinking the siloxane chains (a linear polymer composed of a siloxane bond) to form a membrane. In the partial structure represented by general formula (I), it is allowable that all of the bonding hands of $M^1$ and $M^2$ be bonded to oxygen atoms which are present in other partial structures represented by formula (I) and bonded to the silicon atoms, and also allowable that some of the bonding hands of $M^1$ and $M^2$ be bonded to a hydroxyl group or bonded to a metal atom not constituting the partial structure represented by general formula (I) through an oxygen atom. Further, when $R^1$ or $R^2$ in the partial structure represented by general formula (I) is a hydroxyl group, $M^1$ and $M^2$ may be bonded to the oxygen atom present in the hydroxyl group of $R^1$ or $R^2$ in the partial structure represented by another general formula (I).

Among the gas-permeable membranes according to the first aspect of the present invention, in those having a partial structure represented by general formula (II), at least one of the bonding hands of $M^3$ is bonded to an oxygen atom which is present in another partial structure represented by formula (II) and bonded to the silicon atom, thereby crosslinking the silsesquioxane derivatives to form a membrane. It is allowable that all of the banding hands of $M^3$ in the partial structure represented by general formula (II) be bonded to oxygen atoms which are present in other partial structures represented by general formula (II) and bonded to the silicon atoms, and allowable that some of the bonding hands of $M^3$ be bonded to a hydroxyl group or some of the bonding hands of $M^3$ be bonded to metal atoms not forming the partial structure represented by formula (II) through oxygen atoms.

The gas-permeable membrane according to the first aspect of the present invention may have only one type of partial structure represented by general formula (I), or may have two or more types of partial structures. For example, it may have partial structures represented by two or more types of general formulas (I) having different types of metal atoms, or may have partial structures represented by two or more types of general formulas (I) having different side chains in the siloxane chain moiety. Similarly, the gas-permeable membrane according to the first aspect of the present invention may have only one type of partial structure represented by general formula (II), or may have two or more types of partial structures represented by formulas (I) having different metal atoms. In addition, the gas-permeable membrane according to the first aspect of the present invention includes a polymer membrane containing partial structures represented by one or two or more types of general formulas (I) and partial structures represented by one or two or more types of general formulas (II).

The amount of the metal atoms in the gas-permeable membrane according to the first aspect of the present invention is not particularly limited as long as it is an amount capable of forming a membrane and the amount can be appropriately determined in consideration of the type of the metal atom, the structure of the repeating unit and molecular weight of the polymer having the siloxane bond crosslinked by the metal atom as the main chain, and the like. If the amount of the metal atoms is too large, the metal atoms are bonded to each other via oxygen atoms, the region where the metal atoms are accumulated (inorganic phase) becomes wider, the polymer membrane becomes too hard, cracks etc. may occur. Therefore, in the gas-permeable membrane according to the first aspect of the present invention, the amount of the metal atoms is preferably in a range of 2 to 30% by mass in terms of metal oxide with respect to the total solid content, and more preferably in a range of 5 to 20 mass %. Within this range, it is possible to obtain a polymer membrane having a sufficient crosslinking structure and having appropriate flexibility.

Since the gas-permeable membrane according to the first aspect of the present invention is a polymer membrane having a siloxane bond as a main chain, it has higher permeability to carbon dioxide gas and hydrogen gas than permeability to nitrogen gas. That is, selectivity to acid gas and hydrogen gas is higher as compared with nitrogen gas, and particularly excellent in selectivity to carbon dioxide gas. In addition, since it contains metal atoms as constituents, it is also excellent in mechanical strength. Furthermore, since metal atoms are used as a crosslinking agent between the polymers, the gas-permeable membrane according to the first aspect of the present invention is different from a polymer membrane in which fine metal particles are dispersed therein, and the organic phase composed of the polymer and the inorganic phase composed of the metal atom can smoothly transfer to each other in the membrane without fracture, and the surface thereof is smooth without irregularities due to the fine particles. In the polymer membrane in which fine metal particles are dispersed, the gas selectivity tends to be lowered, whereas, in the gas-permeable membrane according to the first aspect of the present invention, it is presumed that the absence of fracture in this inorganic phase and organic phase is one of the reasons why the gas selectivity is not impaired while the mechanical strength is increased.

In general, in polymer membranes, gas permeability tends to decline as the gas selectivity is improved. On the other hand, the gas-permeable membrane according to the first aspect of the present invention is capable of improving gas selectivity without impairing gas permeability and capable of improving gas permeability without impairing the gas selectivity compared with a polymer membrane not crosslinked with metal atoms. In particular, in a polymer membrane in which the metal atom is titanium, the gas selectivity tends to be further improved while maintaining gas permeability compared with a polymer membrane having siloxane bonds which are not crosslinked as a main chain. Further, in a polymer membrane in which the metal atom is zirconium, the gas permeability tends to be further improved while maintaining gas selectivity compared with a polymer membrane having siloxane bonds which are not crosslinked as a main chain.

<Composition for Forming Gas-Permeable Membrane>

The composition for forming a gas-permeable membrane according to the second aspect of the present invention includes a polymer having a siloxane bond as a main chain and having at least two hydroxyl groups per molecule (hereinafter, may be referred to as "polymer (H)"), and a metal compound capable of generating at least two hydroxyl groups per molecule by hydrolysis (hereinafter, may be referred to as "metal compound (W)"). By dehydration condensation of the hydroxyl group in the polymer (H) and the hydroxyl group in the metal compound having at least two hydroxyl groups per molecule produced from the metal compound (W), a polymer membrane in which the polymer (H) is crosslinked by the metal in the metal compound (W) can be produced. The produced polymer membrane can be used as a gas-permeable membrane because it has high gas permeability and has higher permeability to carbon dioxide gas and hydrogen gas than to nitrogen gas, as the gas-permeable membrane according to the second aspect of the present invention has. In particular, since it is excellent in both selectivity and permeability to carbon dioxide, it is suitable as a gas-permeable membrane for separating carbon dioxide. That is, the composition for forming a gas-permeable membrane according to the second aspect of the present invention is a to raw material composition for a gas-permeable membrane.

The polymer (H) contained in the composition for forming a gas-permeable membrane according to the second aspect of the present invention may be a linear chain or a structure other than a linear chain such as a cage shape. In addition, the polymer (H) contained in the composition for forming a gas-permeable membrane may be of one type or of two or more types. The polymer (H) preferably includes at least one selected from the group consisting of a linear polymer having a siloxane bond as a main chain and having at least two hydroxyl groups per molecule (siloxane chain having at least two hydroxyl groups per molecule) and silsesquioxane derivatives having at least two hydroxyl groups per molecule.

The siloxane chain contained in the composition for forming a gas-permeable membrane according to the second aspect of the present invention may be a siloxane chain having a hydroxyl group at both ends, or a siloxane chain having a hydroxyl group at one or more ends and one or more side chains, or a siloxane chain having at least two hydroxyl groups only in the side chain. Since it is expected that a more homogeneous polymer membrane is formed, the siloxane chain contained in the gas-permeable membrane-forming composition according to the second aspect of the present invention is preferably a siloxane chain having a hydroxyl group at both ends, more preferably a siloxane chain having a silanol group.

As the siloxane chain contained in the composition for forming a gas-permeable membrane according to the second aspect of the present invention, part or all of the hydrogen atoms of the side chain may be substituted with various functional groups or atoms. Examples of the substituents of the hydrogen atoms of the side chain include a hydroxyl group, a halogen atom, an alkyl group having 1 to 18 carbon atoms which may have a substituent, an alkyl group having 2 to 18 carbon atoms which may have a substituent, an alkenyl group having 1 to 6 carbon atoms which may have a substituent, an alkenyloxy group having 2 to 6 carbon atoms which may have a substituent, an alkenyl group which may have a substituent, an alkyloxycarbonyl group, an amino group, an aryl group which may have a substituent, an aryloxy group which may have a substituent, and the like. As the substituent of the alkyl group, the alkenyl group, the alkoxy group, alkenyloxy group, the alkyloxycarbonyl group, the aryl group, and the aryloxy group, the examples listed as the substituents of each of functional groups in $R^1$ can be used.

Specifically, the siloxane chain contained in the composition for forming a gas-permeable membrane according to the second aspect of the present invention is preferably a polymer represented by the following general formula (III). In general formula (III), $R^1$ and $R^2$ respectively are the same as in general formula (I), and m2 is a positive integer.

[Chemical formula 5]

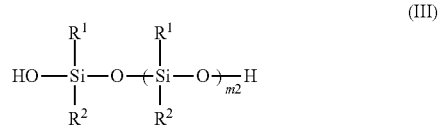

(III)

Among the siloxane chains, as the siloxane chain contained in the composition for forming a gas-permeable membrane according to the second aspect of the present invention, a polymer represented by general formula (III), wherein $R^1$ and $R^2$ are each independently a hydrogen atom, a methyl group, an ethyl group, a propyl group, an isopropyl group, a phenyl group, a tolyl group, or a xylyl group is preferable, and a polymer represented by general formula (III), wherein $R^1$ and $R^2$ are each independently a methyl group, an ethyl group, a propyl group, or an isopropyl group is more preferable, and a polymer represented by general formula (III), wherein both $R^1$ and $R^2$ are methyl groups (dimethylpolysiloxane having silanol groups at both ends) is particularly preferable.

The silsesquioxane derivative contained in the composition for forming a gas-permeable membrane according to the second aspect of the present invention may be a cage structure, a ladder structure, or a random structure. As the silsesquioxane derivative contained in the composition for forming a gas-permeable membrane according to the second aspect of the present invention, since it is expected that a more homogeneous polymer membrane can be formed, those having a cage structure or a ladder structure are preferable, and those having a cage structure are more preferable.

The silsesquioxane derivative may have at least two hydroxyl groups per molecule, and part or all of hydrogen atoms on the side chain may be substituted with various functional groups or atoms. As the substituents of the hydrogen atoms of the side chain, for example, those mentioned as the substituents of the hydrogen atoms on the side chain of the siloxane chain can be used.

Specifically, the silsesquioxane derivative contained in the composition for forming a gas-permeable membrane according to the second aspect of the present invention is preferably a polymer represented by the following general formula (IV). In general formula (IV), * represents a bonding hand that bonds to the silicon atom of the main chain.

[Chemical formula 6]

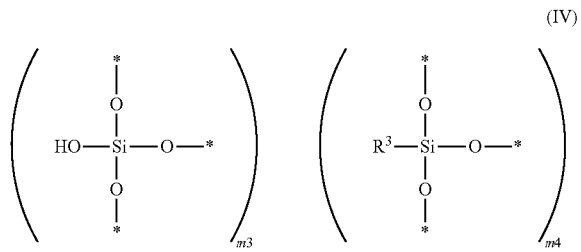

(IV)

In general formula (IV), $R^3$ represents a hydrogen atom, an alkyl group having 1 to 6 carbon atoms, an alkenyl group having 2 to 6 carbon atoms, an alkoxy group having 1 to 6 carbon atoms, an alkenyloxy group having 2 to 6 carbon atoms, an aryl group, or an aryloxy group. As the alkyl group, the alkenyl group, the alkoxy group, the alkenyloxy group, the aryl group and the aryloxy group, the same groups as those described above for $R^1$ can be exemplified.

In general formula (IV), m3 is a positive number, and m4 is a number of 0 or more. The larger the ratio of m3 to the sum of m3 and m4 (m3/(m3+m4)), the more the number of hydroxyl groups contained in one molecule and the more the crosslinking by metal atoms is made, thereby the more easily the membrane is formed. As the polymer represented by general formula (IV), a polymer having m3/(m3+m4) of 0.5 or more is preferable, and a polymer having m3/(m3+m4) of 0.8 or more is more preferable.

The molecular weight of the polymer (H) is not particularly limited, and commercially available siloxane chains and silsesquioxane derivatives can be widely used. As the polymer (H) contained in the composition for forming a gas-permeable membrane according to the second aspect of the present invention, for example, one having a weight-average molecular weight (Mw) in a range of 100 to 100,000 may be used, and one having a weight-average molecular weight (Mw) in a range of 500 to 36,000 is preferable. The weight-average molecular weight (Mw) of the polymer (H) is defined as "molecular weight", which is the weight-average molecular weight in terms of polystyrene by GPC (gel permeation chromatography). In the case where the composition for forming a gas-permeable membrane according to the second aspect of the present invention contains a polymer (H) having a relatively large molecular weight, a polymer membrane superior in mechanical strength can be formed from the composition. Conversely, when a polymer (H) having a relatively small molecular weight is contained, a polymer membrane excellent in flexibility and transparency can be formed from the composition.

The metal compound (W) contained in the composition for forming a gas-permeable membrane according to the second aspect of the present invention is not particularly limited as long as it is a metal compound having a functional group capable of generating a hydroxyl group by hydrolysis. It is preferable that the functional group be directly bonded to the metal atom.

As the metal atoms in the metal compound (W), germanium, antimony, selenium, tellurium and the like can be included in addition to ordinary metals. The metal atom in the metal compound (W) is preferably titanium, zirconium, hafnium, aluminum, niobium, lanthanide, yttrium, barium, cobalt, iron, tantalum, silicon or boron, more preferably titanium, zirconium, hafnium, more preferably aluminum, niobium, silicon or boron, and more preferably titanium or zirconium. In addition, the number of metal atoms in the metal compound (W) may be 1 or 2 or more, and preferably 1.

Examples of the functional group capable of generating a hydroxyl group by hydrolysis include an alkoxy group, an isocyanate group, a carbonyl group, and the like. Since halogen atoms also have the same function, halogen atoms are also included in the examples of the functional groups in the present invention.

As the alkoxy group, a linear or branched alkoxy group having 1 to 6 carbon atoms such as a methoxy group, ethoxy group, n-propoxy group, isopropoxy group, n-butoxy group and the like can be mentioned.

As the halogen atom, a chlorine atom, fluorine atom, bromine atom, iodine atom and the like can be mentioned, and among them, a chlorine atom is preferable.

The metal compound (W) may have atoms or organic groups other than the above-mentioned "functional group capable of generating a hydroxyl group by hydrolysis". As the atom, for example, a hydrogen atom can be mentioned. As the organic group, for example, an alkyl group (preferably an alkyl group having 1 to 6 carbon atoms) and the like can be mentioned, and an ethyl group and methyl group are preferable.

As the metal compound (W), for example, a metal compound having an alkoxy group, a metal compound having an isocyanate group, a metal compound having a halogen atom or a metal compound having a carbonyl group can be mentioned.

As the metal compound having an alkoxy group (hereinafter, may be referred to as "metal alkoxides"), the following can be mentioned.

For example, metal alkoxide compounds of metal other than rare earth metal, such as a titanium butoxide (Ti(O-nBu)$_4$), zirconium propoxide (Zr(O-nPr)$_4$), aluminum butoxide (Al(O-nBu)$_3$), niobium butoxide (Nb(O-nBu)$_5$), silicon tetramethoxide (Si(O-Me)$_4$), boron ethoxide (B(O-Et)$_3$) or the like; metal alkoxide compounds of rare earth metal such as a lanthanide isopropoxide (Ln(O-iPr)$_3$) and yttrium isopropoxide (Y(O-iPr)$_3$) or the like; double alkoxide compounds such as a barium titanium alkoxide (BaTi(OR$^{60}$)$_{n11}$) (wherein "R$^{60}$" is an alkyl group having 1 to 6 carbon atoms and n11 is an integer of 2 to 4); metal alkoxide compounds having two or more alkoxy groups and having an organic group other than an alkoxy group, such as a methyltrimethoxysilane (MeSi(O-Me)$_3$), diethyldiethoxysilane (Et$_2$Si(O-Et)$_2$) or the like; metal alkoxide compounds having a ligand such as an acetylacetone and having two or more alkoxy groups, or the like may be exemplified.

It is also possible to use fine particles of alkoxide sol or alkoxide gel obtained by adding a small amount of water to the metal alkoxides and partially hydrolyzing and condensing them.

Furthermore, the metal alkoxides also include binuclear or cluster type alkoxide compounds having a plural number of or a plurality of types of metal elements such as a titanium butoxide tetramer (C$_4$H$_9$O[Ti(OC$_4$H$_9$)$_2$O]$_4$C$_4$H$_9$) or the like, a polymer based on a metal alkoxide which is one-dimensionally crosslinked via an oxygen atom, and the like.

As the metal compound (W) having an isocyanate group, a compound having two or more isocyanate groups represented by general formula "M(NCO)$_{n12}$" (wherein M is a metal atom, n12 is an integer of 2 to 4) can be exemplified. Specifically, tetraisocyanate silane (Si(NCO)$_4$), titanium tetraisocyanate (Ti(NCO)$_4$), zirconium tetraisocyanate (Zr(NCO)$_4$), aluminum triisocyanate (Al(NCO)$_3$) or the like may be exemplified.

As the metal compound (W) having a halogen atom, a halogenated metal compound having at least two (preferably 2 to 4) halogen atoms represented by general formula "M(X)$_{n13}$" (wherein M is a metal atom, X is one selected from a fluorine atom, chlorine atom, bromine atom and an iodine atom, and n13 is an integer of 2 to 4) can be exemplified. The compound having a halogen atom may be a metal complex. Specifically, tetrachlorotitanium (TiCl$_4$), tetrachlorosilane (SiCl$_4$) and the like can be exemplified. In addition, cobalt chloride (CoCl$_2$) and the like can also be exemplified as the metal complex.

Examples of the metal compound (W) having a carbonyl group include metal carbonyl compounds such as titanium oxoacetylacetate (TiO(CH$_3$COCH$_2$COO)$_2$) and pentacarbonyl iron (Fe(CO)$_5$), and multinuclear clusters thereof.

As the metal compound (W), metal alkoxides or a metal compound represented by the above general formula "M(X)$_{n13}$" are preferable, and the metal alkoxides are more preferable, because when reacting with the polymer (H), a polymer membrane in which the metal atom in the metal compound (W) and the silicon atom in the main chain of the polymer (H) are directly bonded to each other by covalent bonding via an oxygen atom can be easily formed.

The amount of the metal compound (W) is preferably in a range of 2 to 30% by mass in terms of metal oxide with respect to the total solid content, and more preferably in a range of 5 to 20 mass %. Within this range, it is possible to obtain a polymer membrane having a sufficient crosslinking structure and having appropriate flexibility.

The composition for forming a gas-permeable membrane according to the second aspect of the present invention may contain other polymers other than the polymer (H) as long as the membrane formation by heat treatment is not impaired. Examples of other polymers include siloxane chains having only one hydroxyl group per molecule, siloxane chains not having a hydroxyl group, polymers in which the main chain is composed of bonds other than siloxane bonds, and the like. The content of the other polymers is preferably less than 50 mass %, more preferably less than 30 mass % with respect to the total solid content of the polymer in the composition.

The composition for forming a gas-permeable membrane according to the second aspect of the present invention may be one in which each component is dissolved in a solvent. As the solvent, any solvent may be used as long as it can dissolve each component used in the composition to form a homogeneous solution, and water may be used, an organic solvent may be used, a mixed solvent of water and an organic solvent may be used. As the organic solvent, ketones such as γ-butyrolactone, acetone, methyl ethyl ketone, cyclohexanone, methyl isoamyl ketone, 2-heptanone or the like; polyhydric alcohols and derivatives thereof such as a monomethyl ethers such as an ethylene glycol, ethylene glycol monoacetate, diethylene glycol, diethylene glycol monoacetate, propylene glycol, propylene glycol monoacetate, propylene glycol monomethyl ether acetate (PGMEA), dipropylene glycol or dipropylene glycol monoacetate, monoethyl ether, monopropyl ether, monobutyl ether, monophenyl ether or the like; cyclic ethers such as tetrahydrofuran, dioxane or the like; esters such as a methyl lactate, ethyl lactate (EL), methyl acetate, ethyl acetate, butyl acetate, methyl pyruvate, ethyl pyruvate, methyl methoxypropionate, ethyl ethoxypropionate or the like; alcohols such as methanol, ethanol, isopropanol or the like, chlorine type organic solvents such as chloroform, trichlorethylene, tetrachlorethylene, dichloromethane or the like; alkyl amides such as dimethylsulfoxide, dimethylformamide, dimethylacetamide or the like; nitriles such as acetonitrile or the like; may be exemplified. These organic solvents may be used singly or as a mixed solvent of two or more types. Although the amount of the organic solvent is not particularly limited, it is preferable that the solid content concentration of the composition be a sufficient amount so that the composition can be applied on a solid substrate.

The composition for forming a gas-permeable membrane according to the second aspect of the present invention may contain various additives for adjusting the coating property to a solid substrate and physical properties of the polymer membrane to be formed. Examples of such additives include plasticizers, surfactants, thickeners and the like.

<Method for Producing Gas-Permeable Membrane>

A method for producing a gas-permeable membrane according to a third aspect of the present invention is a method for producing a polymer membrane by heating a composition for forming a gas-permeable membrane according to the second aspect of the present invention. When the composition is heat-treated, the functional group bonded to the metal atom of the metal compound (W) is converted into a hydroxyl group, and this hydroxyl group and the hydroxyl group in the polymer (H) undergo dehydration condensation, thereby forming a polymer membrane. It is to be noted that instead of the heat treatment, by subjecting the composition to an acid treatment or an alkali treatment, the functional group bonded to the metal atom of the metal compound (W) can be converted into a hydroxyl group, and the converted hydroxyl group and the hydroxyl group in the polymer (H) can be dehydrated and condensed.

For example, in the case where the composition for forming a gas-permeable membrane contains a polymer represented by general formula (III) as the polymer (H), metal alkoxides, a compound represented by general formula "$M(X)_{n13}$", a metal compound represented by general formula "$M(NCO)_{n12}$", or a metal compound having a carbonyl group as the metal compound (W), a polymer membrane having a partial structure represented by the formula (I) can be produced by dehydration condensation reaction.

The condition for the heat treatment is not particularly limited as long as a temperature and a heating time are sufficient for the functional group bonded to the metal atom of the metal compound (W) to be converted into a hydroxyl group and this hydroxyl group and the hydroxyl group in the polymer (H) undergo dehydration condensation. For example, by performing heat treatment at 50 to 250° C. for 1 to 150 hours, a polymer membrane can be formed. Further, it is also allowable that a heat treatment at 50 to 100° C. for 10 minutes to 60 hours be performed, followed by performing a heat treatment at 100 to 250° C. for 1 to 96 hours.

For example, a polymer membrane in which a polymer (H) is crosslinked with metal atoms can be produced on a surface of a solid substrate by applying the composition for forming a gas-permeable membrane on the solid substrate and subjecting it to heat treatment.

Because the formed polymer membrane, as with the gas-permeable membrane according to the first aspect of the present invention, has a smooth transition between the inorganic phase and the organic phase and has a smooth surface, it is excellent in adhesion to the solid substrate.

The formed polymer membrane, as with the gas-permeable membrane according to the first aspect of the present invention, is excellent in gas permeability and gas selectivity to carbon dioxide gas and hydrogen gas. Therefore, a porous base material used as a solid substrate and a porous base material having a polymer membrane formed on the surface thereof can be used as a gas separation membrane. For example, when a mixed gas containing a plurality of gases is brought into contact with a polymer membrane formed on the surface of a porous substrate, since carbon dioxide gas preferentially permeates the polymer membrane, carbon dioxide gas can be selectively separated and recovered.

As the porous substrate, the material and shape thereof are not particularly limited as long as it has a sufficient strength. For example, it may be a porous membrane made of resin, or it may be a filter such as glass or paper. Examples of the resin used as a material of the porous membrane include polyolefin resins such as polyethylene, polypropylene or the like; fluorine-containing resins such as polytetrafluoroethylene, polyvinyl fluoride, polyvinylidene fluoride or the like; various resins such as polystyrene, cellulose acetate, polyurethane, polyacrylonitrile, polysulfone, polyether sulfone, polyimide, polyamide, polycarbonate or the like.

By increasing the membrane thickness of the polymer membrane formed on the surface of the porous substrate, the gas permeability is lowered but the selectivity to carbon dioxide gas is increased. By decreasing the membrane thickness of the polymer membrane, the selectivity decreases, but the gas permeability increases. Therefore, the thickness of the polymer membrane to be formed on the surface of the porous substrate can be adjusted so that the targeted permeability and selectivity of the gas can be achieved.

EXAMPLE

Next, the present invention will be described in more detail using Examples, though the present invention is not limited by these Examples.

Example 1

Polydimethylsiloxane (PDMS-OH) having Si—OH (silanol group) at the end was dissolved in isopropanol. Four types of PDMS-OH with four different viscosities were used. The viscosity of PDMS-OH with the lowest viscosity was 25 cSt and the molecular weight thereof was 550. The viscosities of the other three types of PDMS-OH were 64, 750 and 1800 to 2200 respectively. In general, since the viscosity and the molecular weight are proportional to each other, the molecular weights of the remaining three types of PDMS-OH were calculated as 1800 (viscosity: 64 cSt), 18000 (viscosity: 750 cSt), 36000 (Viscosity: 1800 to 2200 cSt), based on the fact that when the molecular weight is 550, the viscosity is 25 cSt.

Titanium-n-butoxide was added to an isopropanol solution in which PDMS-OH was dissolved, and the mixture was stirred for 30 minutes. Titanium-n-butoxide was added so that the weight percentage of $TiO_2$ when the titanium-n-butoxide is completely converted to titanium oxide ($TiO_2$) is 5%, 10%, 15% or 20% with respect to the final membrane material (total solid content). The mixed solution was heated at 70° C. for 1 hour.

Next, this mixed solution (5-6 mL) was added dropwise into a Teflon (registered trademark) petri dish, heated at 60° C. for 48 hours, and further heated at 150° C. for 72 hours. Thereafter, the membrane was allowed to cool to room temperature, and the formed membrane was peeled from the petri dish. The thickness of the produced membrane was 300 to 1000 μm.

Kapton tape and alumina tape (inner diameter: 2 cm, outer diameter: 5 cm, in both tapes) having an O ring shape were attached to the obtained membrane. Further, this was placed on a porous polycarbonate filter membrane (pore diameter: 1.2 μm) and a gas permeation test was carried out using a gas permeation measuring device ("GTR-11A/31A", manufactured by GTR Tec Corporation). The test temperature was 25° C., hydrogen, nitrogen, carbon dioxide and oxygen pressurized to 100 kPa against the membrane were supplied and the membrane permeate side was depressurized. As a result, the pressure difference between the front and back of the membrane was 200 kPa. The gas on the permeate side was collected for 10 minutes and analyzed by gas chromatography to calculate the gas permeability coefficient P of each gas. Gas permeation selectivity α was calculated by dividing each gas permeability coefficient.

TABLE 1

| $TiO_2$ (%) | PDMS-OH (Mw) | $P(H_2)$, barrer | $P(O_2)$, barrer | $P(N_2)$, barrer | $P(CO_2)$, barrer | α, ($CO_2$/$N_2$) | α, ($O_2$/$N_2$) | α, ($H_2$/$N_2$) |
|---|---|---|---|---|---|---|---|---|
| 5  | 36,000 | 748  | 471  | 226 | 2580 | 11.42 | 2.09 | 3.31 |
| 10 | 36,000 | 1575 | 1091 | 447 | 5314 | 11.90 | 2.44 | 3.53 |
| 15 | 36,000 | 989  | 752  | 307 | 4108 | 13.38 | 2.45 | 3.22 |
| 20 | 36,000 | 951  | 590  | 178 | 2903 | 16.35 | 3.32 | 5.36 |
| 5  | 18,000 | 788  | 491  | 201 | 2776 | 13.83 | 2.45 | 3.92 |

TABLE 1-continued

| TiO$_2$ (%) | PDMS-OH (Mw) | P(H$_2$), barrer | P(O$_2$), barrer | P(N$_2$), barrer | P(CO$_2$), barrer | α, (CO$_2$/N$_2$) | α, (O$_2$/N$_2$) | α, (H$_2$/N$_2$) |
|---|---|---|---|---|---|---|---|---|
| 10 | 18,000 | 1118 | 659 | 248 | 3881 | 15.64 | 2.65 | 4.51 |
| 15 | 18,000 | 1378 | 682 | 286 | 3538 | 12.35 | 2.38 | 4.81 |
| 20 | 18,000 | 1267 | 580 | 248 | 3307 | 13.35 | 2.34 | 5.12 |
| 5 | 1,800 | 623 | 357 | 148 | 3123 | 21.04 | 2.40 | 4.20 |
| 10 | 1,800 | 1452 | 764 | 306 | 4009 | 13.08 | 2.49 | 4.74 |
| 15 | 1,800 | 1086 | 593 | 250 | 3169 | 12.68 | 2.37 | 4.34 |
| 20 | 1,800 | 890 | 408 | 155 | 2219 | 14.31 | 2.63 | 5.74 |
| 5 | 550 | 676 | 361 | 152 | 2227 | 14.65 | 2.37 | 4.44 |
| 10 | 550 | 1272 | 640 | 251 | 3644 | 14.53 | 2.55 | 5.07 |
| 15 | 550 | 1262 | 610 | 255 | 3477 | 13.64 | 2.39 | 4.95 |
| 20 | 550 | 873 | 397 | 139 | 2078 | 14.95 | 2.86 | 6.28 |

The gas permeation test results are shown in Table 1. In Table 1, the column of "TiO$_2$(%)" indicates the content ratio (%) in terms of TiO$_2$ with respect to the total solid content of titanium-n-butoxide used for membrane formation and the column of "PDMS-OH (Mw)" shows the molecular weight of PDMS-OH used for membrane formation.

Generally, the permeability coefficients of carbon dioxide, nitrogen, hydrogen, and oxygen gas of the PDMS membrane known as a high gas-permeable nonporous membrane are 3250, 280, 650 and 600, respectively. As shown in Table 1, in almost all the membranes, the gas permeability coefficient of the hydrogen gas exceeds the PDMS membrane, and in many membranes, the gas permeation coefficient of the carbon dioxide gas exceeds the PDMS membrane. Particularly, in the case of the membrane having the titanium-n-butoxide amount of 10% and 15% and the PDMS-OH used for membrane formation having molecular weights of 36000 and 18000, the gas permeation characteristic values for all the gases are higher than the PDMS membrane, and even when the amount of titanium-n-butoxide was 10% and the molecular weight of PDMS-OH used for membrane formation was 1,800, the gas permeation characteristic values for all gases were superior to those of the PDMS membrane. From these results, it was found that an excellent gas-permeable membrane having a gas permeation characteristic value exceeding that of PDMS can be obtained by cross-linking PDMS-OH with titanium.

Generally, when a membrane has a large defect which is larger than the molecular size, gas leakage occurs and selectivity is not shown. It was concluded that the gas permeability of the membrane produced is not due to membrane defects, since all the membranes formed in this experiment have two or more selectivities.

Example 2

A membrane was formed in the same manner as in Example 1, except that zirconium butoxide was used instead of titanium-n-butoxide, and the same gas permeation test was conducted using three kinds of gases, hydrogen, carbon dioxide and nitrogen, and the gas permeability coefficient P and gas permselectivity α were calculated.

As in the case of using titanium-n-butoxide, zirconium butoxide was added so that the weight percentage of ZrO$_2$ when the zirconium butoxide is completely converted to zirconium oxide (ZrO$_2$) is 5%, 10%, 15%, or 20% with respect to the final membrane material (total solid content). As for the PDMS-OH, the two types among the four types used in Example 1, which have molecular weights of 550 and 1800, were used.

The gas permeation test results are shown in Table 2. In Table 2, the column of "ZrO$_2$(%)" indicates the content ratio (%) in terms of ZrO$_2$ with respect to the total solid content of the zirconium butoxide used for membrane formation, and the column of "PDMS-OH (Mw)" indicates the molecular weight of PDMS-OH used for membrane formation. As a result, gas permeability coefficients of hydrogen gas, carbon dioxide gas, and nitrogen gas in all the membranes exceeded that of the PDMS membrane, and it was found that when a gas-permeable membrane was obtained by cross-linking PDMS-OH with zirconium, the gas permeability characteristic value of PDMS was superior.

TABLE 2

| ZrO$_2$ (%) | PDMS-OH (Mw) | P(H$_2$) barrer | P(N$_2$) barrer | P(CO$_2$) barrer | α, (CO$_2$/N$_2$) | α, (H$_2$/N$_2$) |
|---|---|---|---|---|---|---|
| 5 | 1,800 | 1746 | 561 | 5912 | 10.54 | 3.11 |
| 10 | 1,800 | 1597 | 507 | 5594 | 11.03 | 3.15 |
| 15 | 1,800 | 1138 | 340 | 3910 | 11.49 | 3.34 |
| 20 | 1,800 | 997 | 284 | 3261 | 11.49 | 3.51 |
| 5 | 550 | 1935 | 552 | 6562 | 11.88 | 3.50 |
| 10 | 550 | 1947 | 614 | 6732 | 10.96 | 3.17 |
| 15 | 550 | 1520 | 435 | 5292 | 12.17 | 3.50 |
| 20 | 550 | 797 | 323 | 3355 | 10.40 | 2.47 |

The invention claimed is:

1. A method of selectively separating carbon dioxide gas and/or hydrogen gas from a gas mixture, the method comprising:

allowing a gas mixture comprising a plurality of gases including carbon dioxide gas and/or hydrogen gas to come into contact with a gas-permeable membrane comprising a partial structure represented by formula (I), and separating carbon dioxide gas which passed thorough the gas-permeable membrane:

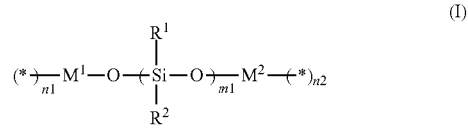

(I)

wherein in formula (I), R$^1$ and R$^2$ each independently represents a hydrogen atom, an alkyl group having 1 to 6 carbon atoms, an alkenyl group having 2 to 6 carbon atoms, an alkoxy group having 1 to 6 carbon atoms, an alkenyloxy group having 2 to 6 carbon atoms, an aryl group or an aryloxy group, M$^1$ and M$^2$ each independently represents zirconium, hafnium, aluminum, niobium or boron, m1 represents a positive integer, n1 and n2 each independently represents an integer of 1 to 3, * represents a bonding hand, and the bonding hands of M$^1$ and M$^2$ are bonded to oxygen atoms which are present in other partial structures represented by formula (I) and bonded to the silicon atoms, bonded to a hydroxyl group, or bonded to a metal atom not constituting the partial structure represented by general formula (I) through an oxygen atom.

2. The method according to claim 1, wherein R$^1$ and R$^2$ each independently represents an alkyl group having 1 to 6 carbon atoms.

* * * * *